United States Patent [19]

Dubé

[11] Patent Number: 4,767,102
[45] Date of Patent: Aug. 30, 1988

[54] THERMAL CUTTING TORCH

[75] Inventor: Mario Dubé, La Pocatière, Canada

[73] Assignee: Bombardier Inc., Canada

[21] Appl. No.: 141,084

[22] Filed: Jan. 5, 1988

[51] Int. Cl.$^4$ .............................................. B23K 7/10
[52] U.S. Cl. ...................................... 266/48; 266/58; 266/76
[58] Field of Search ............................ 266/48, 58, 76

[56] References Cited

U.S. PATENT DOCUMENTS

| 4,273,313 | 6/1981 | DeNardo | 266/58 |
| 4,469,311 | 9/1984 | Laing | 266/67 |
| 4,694,579 | 9/1987 | Källberg | 266/58 |

FOREIGN PATENT DOCUMENTS

| 365495 | 4/1937 | Canada . |
| 1035272 | 7/1978 | Canada . |

Primary Examiner—Wayland Stallard
Attorney, Agent, or Firm—Larson and Taylor

[57] ABSTRACT

A hand-held thermal cutting torch of the plasma arc or oxyfuel type commonly used for cutting metal workpieces such as steel plates, employs a new concept of motorized driving to provide more uniform cutting rates and improved quality of cut. A driving element coaxially surrounding the cutting torch nozzle includes an annular surface for engagement with a template guide surface, the driving element being rotatably mounted and driven from an electric motor that is carried in the handle of the cutting torch.

10 Claims, 4 Drawing Sheets

THERMAL CUTTING TORCH

FIELD OF THE INVENTION

This invention relates to a new or improved thermal cutting torch of the plasma arc or oxyfuel type used for cutting metal workpieces, especially steel plates. More particularly the invention relates to a new concept of motorized driving of a hand-held cutting torch.

DESCRIPTION OF THE PRIOR ART

Numerous arrangements of thermal cutting torches and machines are known in the prior art. For example U.S. Pat. No. 4,469,311 Laing discloses a motorized hand torch having a driving motor in its handle which through a suitable gear drive rotates a wheel arranged vertically alongside the cutting tip to rotate on a horizontal axis, this wheel being in contact with the surface of the workpiece to support the tip at an appropriate spacing therefrom, and guide the tip either longitudinally thereon, or with the aid of a special circle cutting attachment, in an arcuate path. A somewhat similar gas cutting machine is disclosed in Canadian patent No. 1,035,272 granted to Koike Sanso Kogyo Co., Ltd. Both of these prior art torches can cut along straight or slightly curved guides, and also arcuately with the use of special attachments. However because of their configurations there is a limit to the minimum radius of arcuate cut that these devices can produce. Also these devices were designed for oxyfuel cutting only.

It is an object of the present invention to provide a new concept for the driving and guiding of a hand-held thermal cutting torch which concept can be used in both plasma and oxyfuel cutting processes. The resultant cutting torch is characterized by lightweight design and the capacity for accurate cutting of any desired form.

SUMMARY OF THE INVENTION

The present invention provides a thermal cutting torch comprising: a cutting torch nozzle or tip defining a longitudinal axis, a driving element surrounding said nozzle and drive means for rotating said driving element, said driving element including an annular surface for engagement with a template guide surface to interact therewith and upon rotation of said driving element to displace said nozzle along said template surface. The driving element is preferably powered by an electric motor carried in the handle portion of the torch. The driving element may be rotatably mounted around the head of the cutting torch coaxially with the nozzle, the drive from the motor being applied to the driving element through a pair of bevel gears.

BRIEF DESCRIPTION OF THE DRAWINGS

The invention will further be described, by way of example only, with reference to the accompanying drawings wherein:

In FIGS. 1 to 3, a plasma arc cutting torch 10 has an elongate handle 11 at the end of which is a head 12 extending generally at right angles to the handle and incorporating a plasma arc nozzle assembly 13 that is supplied with electrical current and the gas and the coolant through the handle 11. Specifically, as shown in FIG. 2, extending through the handle 11 are: coolant supply and return conduits 3 and 4; a gas supply conduit 5; a plasma current cable 6; and a motor current cable 7. The plasma arc device is not described in detail herein since it is of conventional design. It includes a vertically oriented generally cylindrical body 14 housed within a correspondingly shaped casing 15 at the distal end of the handle. The nozzle assembly 13 has a threaded stem portion 16 that is engaged in an internally threaded nut 17 carried at the lower end of the casing 15 to secure the nozzle assembly thereto. Attached to the lower end of the stem 16 is the nozzle tip 18.

Figure 1:
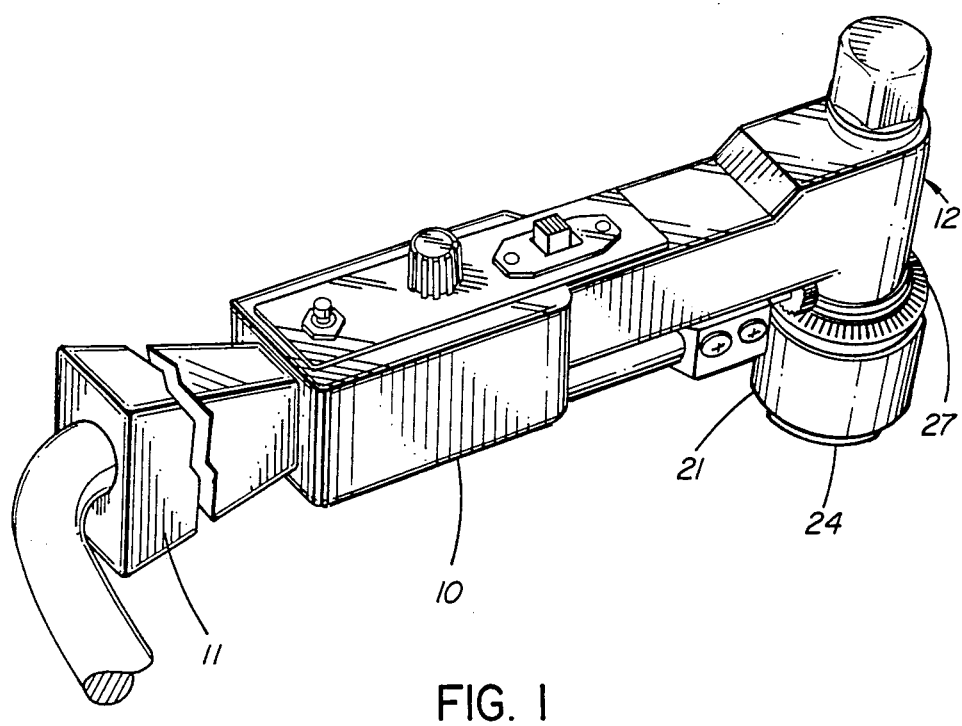
FIG. 1 is a perspective view of a plasma arc cutting torch incorporating the invention.

Coaxially surrounding the lower end of the nozzle assembly is an annular driving element 21 having a cylindrical wall 22 from the lower side of which extends an inwardly directed radial flange 23 within which is supported a guide collar 24. A section of the guide collar projects downwardly from the radial flange and has an annular surface 25 of knurled or serrated surface configuration.

The upper end of the cylindrical wall 22 surrounds and is fixedly attached to a lower tubular extension 26 of an annular bevel gear element 27. The bevel gear element is rotatably supported on the casing 15 by means of a bearing shell 28, the bevel gear 27 being supported axially by a washer 29 carried on the nut 17.

Figure 3:
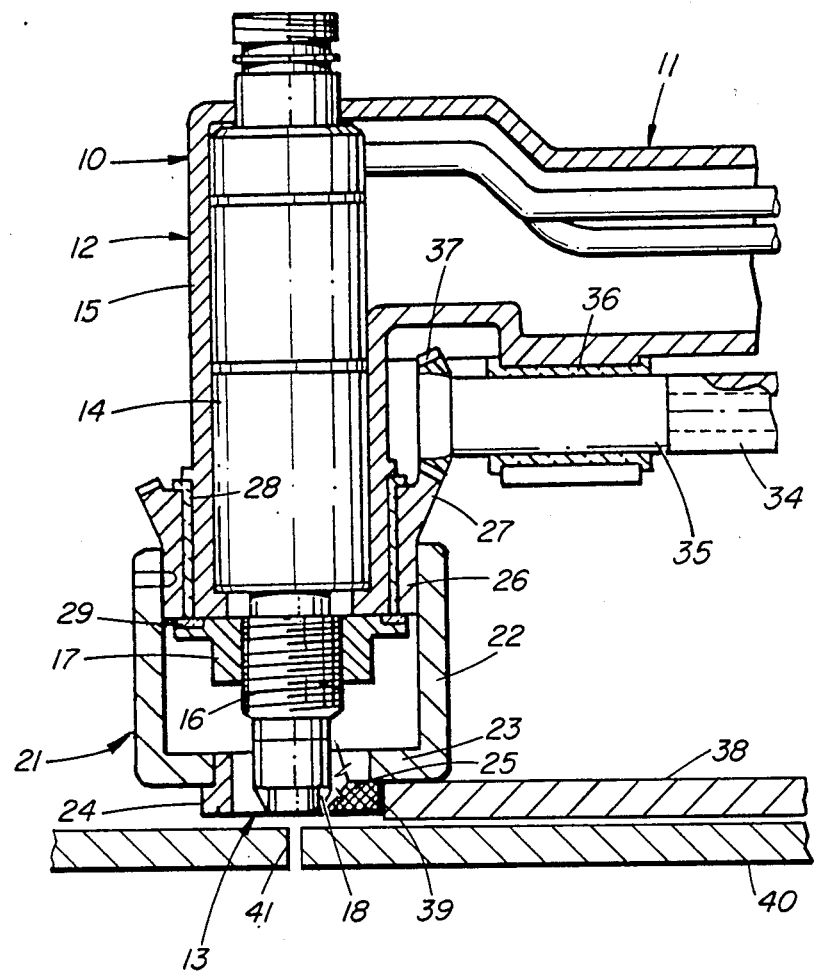
FIG. 3 is a view showing a portion of FIG. 2 to an enlarged scale, and showing the torch in operation.

A variable speed reversible electric motor 32 is mounted within a recess in the handle 11 and has an output shaft 33 connected to a flexible coupling element 34 which in turn is connected to one end of a gear shaft 35 mounted to rotate in a bearing 36 in the handle. The opposite end of the gear shaft 35 is formed with a bevel pinion gear 37 which meshes with the bevel gear 27. From the foregoing it will be understood that rotary drive from the motor 32 is transmitted through the bevel gear drive 37,27 to rotate the driving element 21 with its guide collar 24 coaxially around the vertical axis of the nozzle assembly 13. FIG. 3 shows the plasma arc torch in operation. The workpiece 40 that is to be cut will typically be a metal plate, e.g., steel of thickness between approximately 2 mm and 12 mm. A template 38 with a longitudinal guide edge 39 is suitably secured by clamps (not shown) or otherwise to the workpiece 40 with the edge 39 extending parallel to the line of cut 41. The speed of operation of the motor 32 is selected to correspond to the type and thickness of the material to be cut. First, the approximate speed is set and then after the torch has been initiated, the torch is brought into position as shown in FIG. 3. The arc is initiated and the motor is started simultaneously. Rather than being controlled by a separate "on-off" switch, the motor drive is initiated and stopped by a relay (not shown) that is activated by the plasma current. The speed is adjusted if necessary, the torch being manually held with the underside of the flange 23 of the driving element 21 resting on the top surface of the template 38 and the knurled surface 25 of the guide collar 24 in contact with the edge surface 39 of the template. The cutting torch is held manually in this position, and rotation of the cutting element 21 will cause the plasma arc to progress along the line of cut 41 at the desired uniform speed, it being effected by driving engagement between the knurled surface 25 and the template edge surface 39. It will be appreciated that the dimensions of the various elements are so selected that the nozzle tip 18 of the torch is positioned accurately at the desired height above the surface of the workpiece.

It will be understood that the plasma arc torch as described above is not limited to making cuts that are rectilinear or arcuate, but can in fact make a cut of any desired curvature as determined by the outline followed by the edge surface 39 of the template, including tridimensional shapes. This is achieved by a comparatively simple mechanism that enables accurate control of the cutting path while still employing a hand-held cutting torch. Nonetheless it achieves a uniform rate of movement of the plasma arc along the line of cut, and this is of critical importance in producing cut surfaces of acceptable quality.

Figure 2:
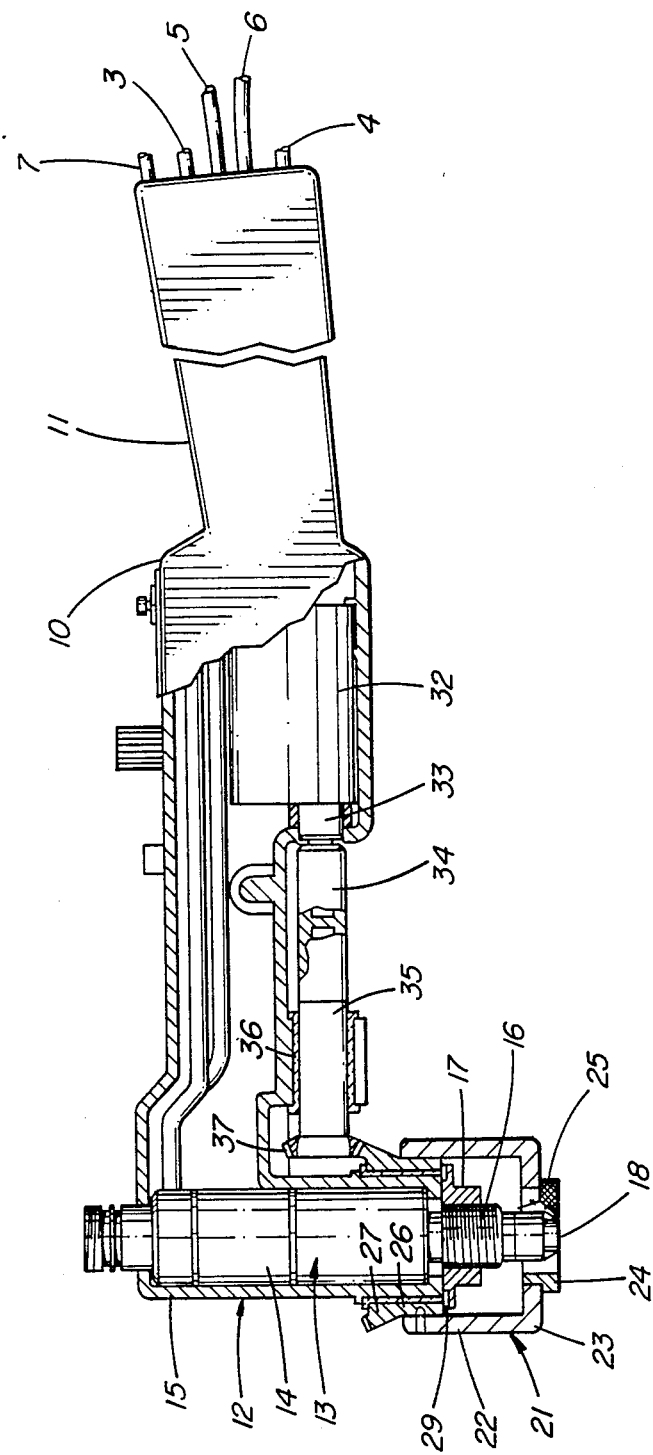
FIG. 2 is an enlarged side elevation of the torch of FIG. 1; shown partly in section.

The plasma arc cutting torch as described above in relation to FIGS. 1 to 3, in addition to its improved driving system, incorporates other advantages over prior art torches. One prior proposal of a motorized plasma arc torch is a hybrid arrangement of a plasma arc cutting head installed in the metallic housing of a motorized torch originally designed for oxygen cutting. In contrast, the improved plasma arc cutting torch of the invention is the first specifically designed motorized plasma torch. It is of compact design and is of reduced weight since the housing is of molded plastics rather than metal. This is of an advantage from the point of view of safety also since such torches are connected to a supply voltage of at least 250 volts and a working voltage of at least 100 volts.

Figure 4:
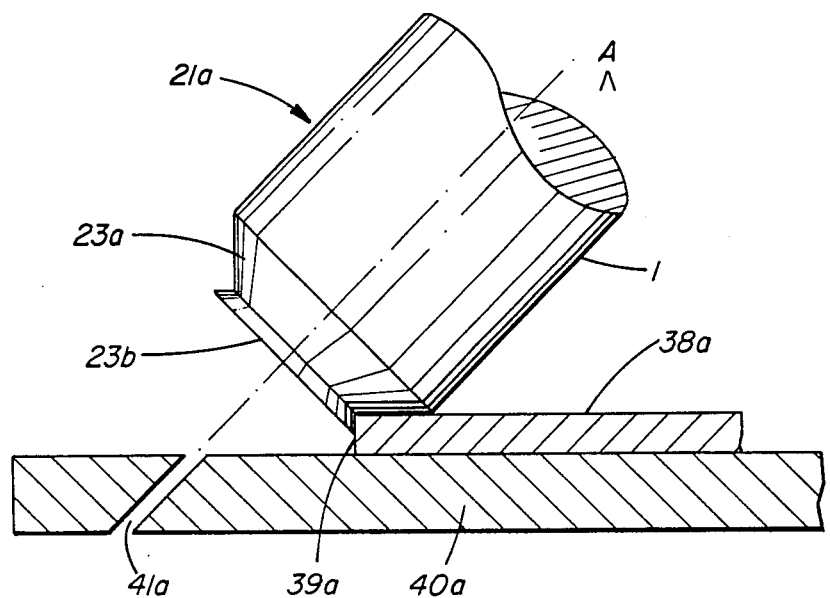
FIG. 4 is a view similar to FIG. 3 showing a modified arrangement.

As illustrated in FIG. 3, the plasma arc cutting torch is set up to produce cuts at an angle of 90° to the plane of the workpiece. However it will be appreciated that by arranging the edge surface 39 of the template at an angle, an angled or bevelled cut could be produced. An alternative configuration is shown in FIG. 4 wherein a modified driving element 21a is provided wherein instead of the radial flange 23 at right angles to the axis of the torch, there would be included a frusto-conical section 23a having a cone angle corresponding to the angle of cut required, so that during cutting this frusto-conical section 23a runs on the upper surface of the template 38a immediately adjacent to the edge surface 39a thereof. As shown in FIG. 4 the driving element 21a (and hence the cutting torch axis A) is maintained in proper registration with the template edge surface 39a by a conically flared extension 23b to the section 23a. The upper edge of the template surface 39a is received in the right-angled groove defined between the conical section 23a and the extension 23b. This engagement maintains the axis A properly aligned and oriented so that the angled cut 41a can be made in the workpiece 40a. The driving element 21a is sized to provide the approximate torch "stand-off" (i.e. the distance between the tip of the torch and the workpiece).

Figure 5:
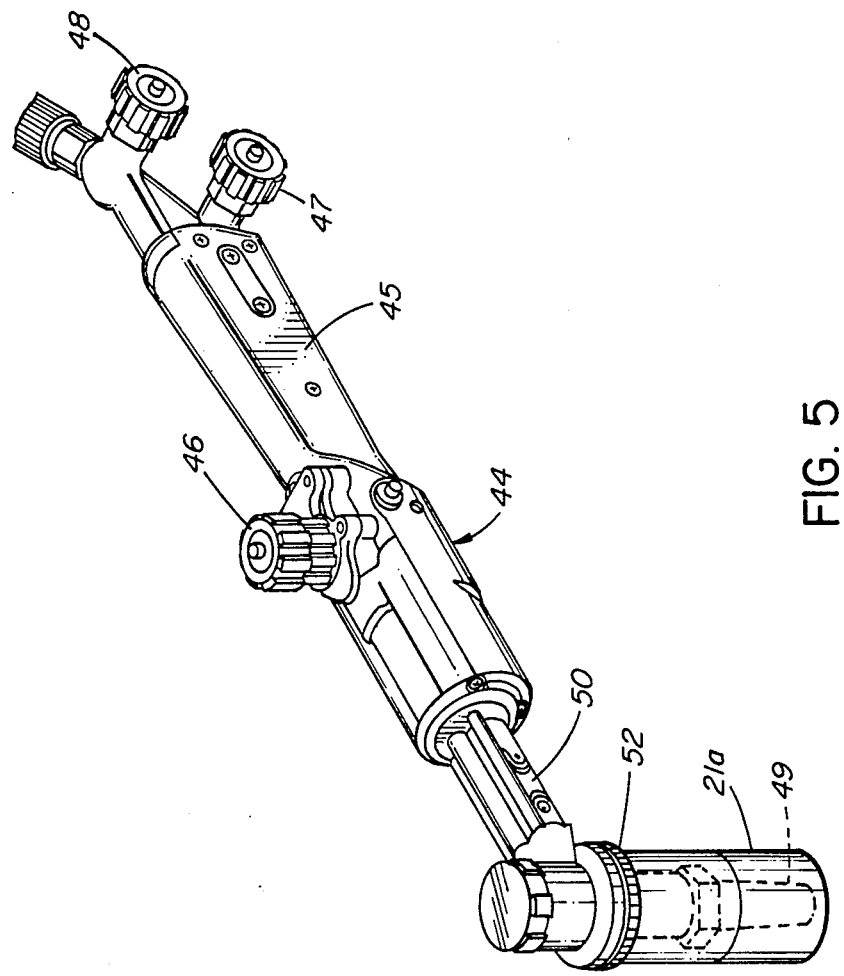
FIG. 5 is a perspective view of an oxyfuel cutting torch incorporating the invention.

The driving system as disclosed above is also applicable to oxyfuel thermal cutting torches as indicated in FIG. 5. This figure shows a modified commercially available oxyfuel thermal cutting torch 44 having a handle 45 through which supplies of cutting oxygen, fuel gas, and pre-heat oxygen are controlled by means of valves 46, 47, and 48 respectively, the gases being delivered in known manner to a cutting tip 49. A motor (not shown) is recessed within the handle and drives a flexible shaft 50 carrying a bevel pinion (not shown) which drives a bevel gear element 52 mounted to rotate coaxially around the cutter tip 49, the lower end of the element 52 carrying a driving element 21a similar to that illustrated in FIGS. 1 to 3 and likewise carrying a guide collar (not shown) engageable with a template to effect driving motion of the torch. While the range of thickness of plate that can be cut by the oxyfuel torch is greater, at approximately 3 mm to 25 mm, unlike a plasma arc torch which can cut any metal, the oxyfuel torch can cut only ferrous metals. The procedure when using the oxyfuel torch is as follows: First the approximate speed is selected and the flame is ignited. The torch is then brought into position on the template and the workpiece is preheated. After preheating the supply of cutting oxygen is opened and simultaneously the motor is started to commence the cutting sequence.

I claim:

1. A thermal cutting torch comprising:
a cutting torch nozzle or tip defining a longitudinal axis, a driving element surrounding said nozzle and drive means for rotating said driving element, said driving element including an annular surface for engagement with a template guide surface to interact therewith and upon rotation of said driving element to displace said nozzle along said template surface.

2. A thermal cutting torch according to claim 1, wherein said driving element is powered by a motor carried on said torch.

3. A thermal cutting torch according to claim 1 including a handle portion, said drive means comprising a motor mounted therein, said motor being connected to said driving element through a gear train.

4. A thermal cutting torch according to claim 3 wherein said motor has an output shaft extending generally longitudinally of said handle and coupled to drive said driving element through a bevel gear pair.

5. A thermal cutting torch according to claim 4 wherein said driving element is generally cylindrical and has an inwardly directed flange at its lower end surrounding an opening within which is received an annular guide which concentrically surrounds lower end of said nozzle or tip, said guide having a rough-textured outer cylindrical surface for driving engagement with the template guide surface.

6. A thermal cutting torch according to claim 5 wherein said flange surface surrounding said guide is adapted to engage the top of the template to control the spacing of the nozzle tip from the surface of the workpiece.

7. A thermal cutting torch according to claim 6 wherein said flange surface is planar.

8. A thermal cutting torch according to claim 6 wherein said flange surface is conically curved.

9. A thermal cutting torch according to claim 1 comprising a plasma arc torch.

10. A thermal cutting torch according to claim 1 comprising an oxyfuel torch.

* * * * *